Oct. 27, 1970   D. ALLPORT   3,535,898
LOCKING ASSEMBLY
Filed Dec. 20, 1968   2 Sheets-Sheet 1
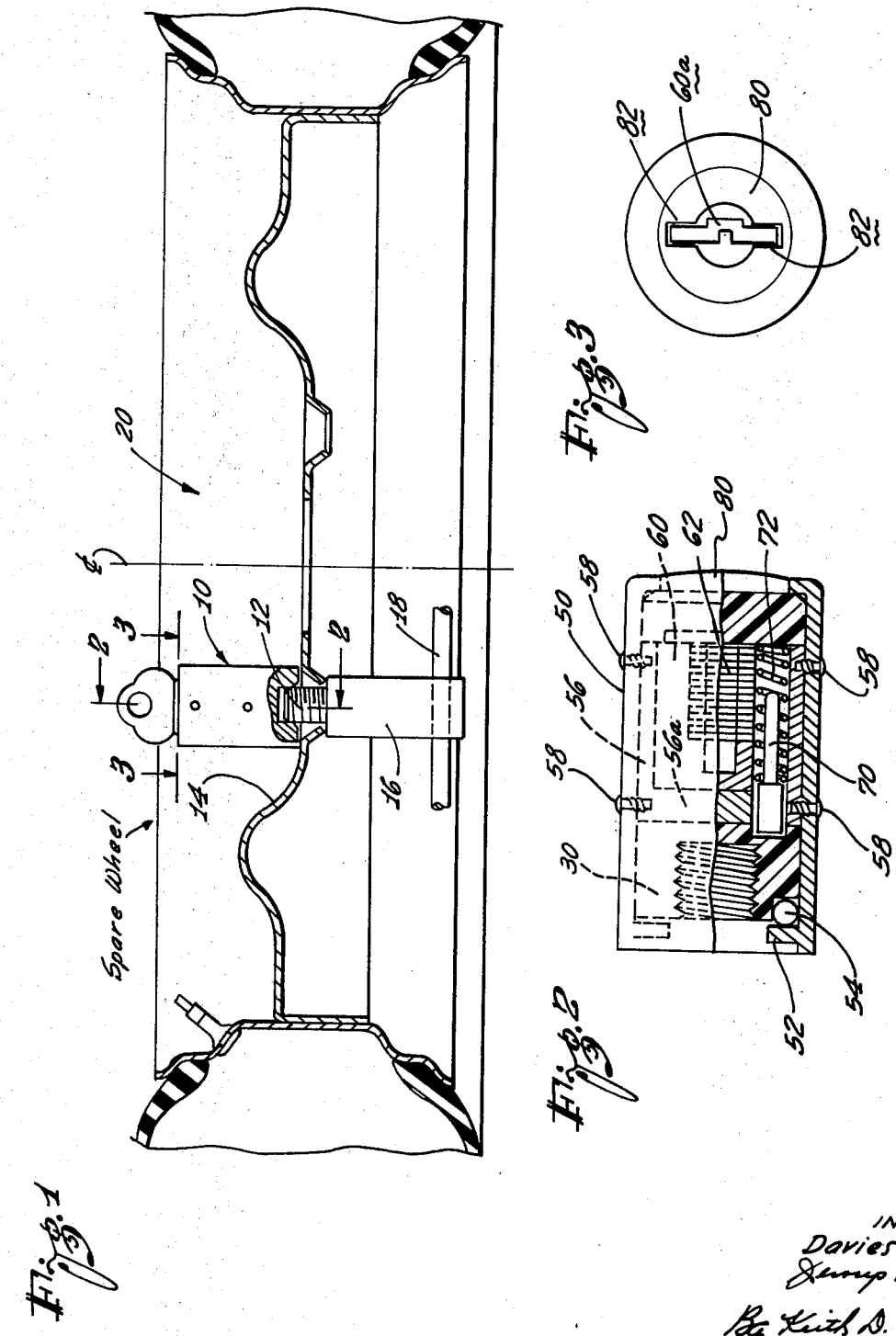
INVENTOR:
Davies Allport
ATTORNEYS Oct. 27, 1970   D. ALLPORT   3,535,898
LOCKING ASSEMBLY
Filed Dec. 20, 1968   2 Sheets-Sheet 2
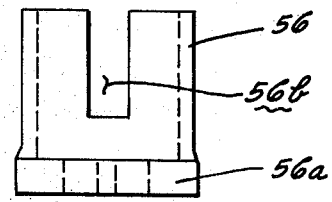
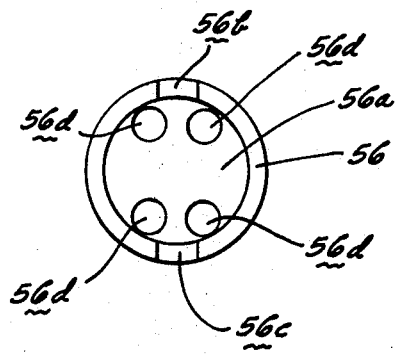
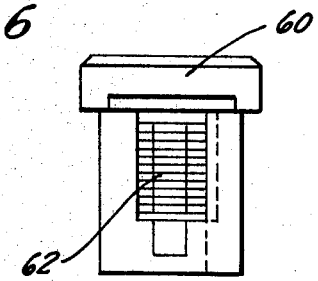
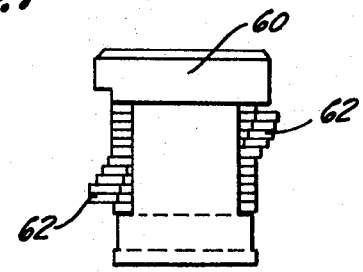
INVENTOR:
Davies Allport
ATTORNEYS United States Patent Office 3,535,898
Patented Oct. 27, 1970

3,535,898
LOCKING ASSEMBLY
Davies Allport, 966 Muirlands Vista Way,
La Jolla, Calif. 92037
Filed Dec. 20, 1968, Ser. No. 785,653
Int. Cl. E05b 11/00; F16b 41/00
U.S. Cl. 70—231                                    7 Claims

ABSTRACT OF THE DISCLOSURE

A key controlled lock assembly is provided which may be applied, for example, to a nut, or other threaded fastener, to prevent the removal of the fastener until the assembly has been unlocked. The assembly of the invention is particularly useful, for example, for locking the spare wheels, batteries, and the like, of motor vehicles so as to prevent their unauthorized removal. The locking assembly of the invention has a feature in that it causes the key to be trapped in the assembly after it has been unlocked, in order to prevent subsequent removal of the key. This expedient prevents the unlocking of the assembly by an authorized keyholder without the owner or lessor of the vehicle being apprised of the fact that the assembly has been unlocked; the owner or lessor being so apprised when the keyholder fails to return the key, or returns the key and lock with the key trapped in the lock.

BACKGROUND OF THE INVENTION

A major problem confronting car rental agencies is that of theft of the equipment included in the vehicle. Especially prevalent is the theft of spare wheels from the trunk of the vehicle, and the theft of batteries, or other readily removable accessories. It is contemplated that the equipment of the vehicle which is subject to removal be locked in place by locking units constructed in accordance with the concepts of the invention. In the practice of the invention, whenever a car is rented, for example, a key is issued to the lessee to permit him to unlock the spare wheel, for example, should an emergency arise. However, if the key is used by the lessee to unlock the spare wheel, the key is then trapped in the locking assembly and cannot be removed. Under normal conditions, when the car is returned, the lessee also returns the aforesaid key which was issued to him. If the key is not returned, or if the key and lock are returned together, the car is immediately checked to see whether the spare wheel or other protected equipment has been removed or replaced.

It will become apparent as the description proceeds that although the locking assembly of the invention has particular application for the purposes outlined in the preceding paragraph, it is of general utility in the protection of property, even from those authorized under particular circumstances to use the property.

BRIEF DESCRIPTION OF THE DRAWINGS

FIG. 1 is a side section showing, for example, a portion of a spare wheel mounted, for example, in the trunk of a vehicle, and locked by a locking assembly which may be constructed in accordance with the concepts of the invention;

FIG. 2 is a side section, taken along the line 2—2 of FIG. 1, of the locking assembly or unit;

FIG. 3 is an end view of the unit taken along the line 3—3 of FIG. 1.

FIGS. 4 and 5 are side and end views respectively of a lock retainer constituting one of the components of the assembly of FIG. 2; and FIGS. 6 and 7 are side elevations of a tubular lock member which is included in the assembly of FIG. 2, the representations of FIGS. 6 and 7 being at angular positions displaced ninety degrees from one another.

DETAILED DESCRIPTION OF THE ILLUSTRATED EMBODIMENT

As shown in FIG. 1, for example, a locking unit 10 may be threaded onto the end of a bolt 12 so as to hold a retainer plate 14 in place across the end of a tubular retainer bracked 16, the bracket 16 being supported, for example, in the trunk of a vehicle on a bar 18, together with the bolt 12. The plate 14 may clamp the hub 20, for example, of a spare wheel in place, so as to support the spare wheel within the trunk of the vehicle.

As will be described, the locking unit or assembly 10 is constructed to include an internal nut member 30 (FIG. 2) which is threaded onto the end of the bolt 12 as the unit is turned, for example, in a normal direction to tighten the nut 30 onto the bolt 12. However, when it is attempted to turn the locking unit 20 in a direction to remove the nut 30 from the bolt 12, the locking unit merely turns freely.

To remove the nut 30, a key must be inserted into the locking unit 10 and actuated. Only then will the turning of the unit 10 permit the nut 30 to be drawn off the end of the bolt 12 to permit the spare wheel to be removed. As mentioned above, a feature of the invention is that the locking unit 10 is constructed to trap the key in it after it has been unlocked. This means that anyone actually unlocking the locking unit so as to remove the spare wheel must apprise the lessor or owner of the vehicle of that fact, either by failing to return the key, or by being forced to return the key together with the locking unit.

In either event, the owner or lessor is immediately aware of the fact that the spare wheel has been removed, so that an appropriate check may be made to assure that it has not been stolen or otherwise disposed of. As mentioned above, the locking unit of the invention may be similarly used in conjunction with batteries, or other equipment associated with the motor vehicle, or in any other environment in which it may find utility.

The locking unit itself, as best shown in FIG. 2, for example, includes an outer tubular housing 50, and the nut 30 is mounted in one end of the housing 50 to be freely rotatable in the housing so long as the lock is not actuated. A retainer ring 52 may be welded or otherwise affixed to the end of the housing to hold the nut in the housing.

One or more balls, such as the ball 54 may be incorporated in a cam race at the bottom edge of the nut, so as to cause the nut to be locked with the tubular housing 50 when the housing is turned in position to tighten the nut onto the end of the bolt 12, and yet to cause the nut to turn freely in the tubular housing 50 when the housing is turned in a direction rormally to unscrew the nut from the bolt.

A cup-shaped retainer member 56 is fitted into the housing 50 in a press-fit with the housing, or it may be retained by pins such as the pins 58. The retainer member 56 has a transverse end portion 56a which extends across the interior of the tubular housing 50 adjacent the end of the nut 30. A tubular lock member 60 is fitted into the retainer 56, and is normally held against relative rotation with the retainer and with the housing 50 by means of tumblers 62. The tumblers 62, as shown in the view of FIG. 7, normally are spring-biased out from the tubular lock member 60 in a radial direction to be received by slots 56b and 56c in the retainer 56, and which are shown in FIGS. 4 and 5.

A bolt member 70 is also supported in the lock member 62, for axial movement along the housing 50. A spring 72 engages the bolt 70 to bias the bolt in the direction of the nut 30. When the locking member 60 is in the locked condition, the bolt 70 engages the transverse portion 56a of the retainer. However, when an appropriate key is inserted through a slot 60a (FIG. 3) in the end of the lock member 60 to cause the tumblers 62 to be withdrawn from the slots 56b and 56c of the retainer, the lock member may be turned until the bolt 70 passes through one of the apertures 56d in the transverse wall 56a of the retainer.

This permits the bolt 70 to be biased against the end of the nut 30, and subsequent rotation of the assembly causes the bolt to be received in a well in the nut, and in the position shown in FIG. 2. It will be appreciated that when the assembly has the condition shown in FIG. 2, the tubular housing 50 may be turned in a direction to unscrew the nut 30 from the bolt 12 of FIG. 1, and the bolt will turn with the housing. It also will be appreciated that when the bolt is released through the retainer 56, upon the turning of the lock member 60 in the retainer, the lock cannot be returned to its original relative angular position with respect to the retainer.

A slotted disc 80 is provided at the end of the tubular housing 50, and when the housing is in an unlocked condition, the key slot 60a is aligned with slot 82 in the disc. However, when the key is turned to actuate the lock member, the key receiving slot 60a is no longer aligned with the slot 82, so that the key cannot be removed. The neck of the key being appropriately narrowed to permit it to be turned with the lock member in the central part of the disc 80. It will be appreciated that there are known means for preventing keys to be removed from locks after the locks have been turned to a particular position, and that such means may be incorporated in the assembly of the present invention for the aforesaid purpose.

The invention provides, therefore, a smiple and improved locking device which may be screwed onto the end of a bolt, or other threaded fastener, to serve as a retaining means for equipment that is to be removed under certain conditions. The locking unit must be unlocked before the equipment may be removed, and when so unlocked, the key used to unlock the unit is immediately trapped in the unit and cannot be removed.

What is claimed is:

1. A lock assembly to be threadably engaged with a threaded member so as to serve as a fastener therefor, said lock assembly including: a threaded fastened adapted threadably to engage said threaded member; a tubular housing; retainer means for supporting said threaded member coaxially in said tubular housing and permitting relative rotational movement between said threaded member and said housing; one-way locking means connecting said threaded member and said housing for joint movement in fastener applying direction; a tubular lock member mounted in said tubular housing and including tumbler means normally preventing relative rotational movement between said lock member and said housing; bolt means mounted in said lock member in position to extend into a well in said threaded fastener upon a predetermined angular alignment between said tubular lock member and said fastener so as to prevent rotation of said threaded fastener in said tubular housing; an apertured transverse retainer member affixed to said tubular housing and extending across the interior thereof between said lock member and said fastener so as to permit said bolt means to enter said well in said fastener only upon the turning of said tubular lock member to a particular angular position with respect to said housing; said lock member having a key-receiving slot therein through which an appropriate key may be inserted to actuate said tumbler means and to turn said lock member to said particular angular position with respect to said tubular housing; and means included in said assembly for preventing withdrawal of said key after said lock member has been turned to said angular position.

2. The combination defined in claim 1, and which includes spring means engaging said bolt means for biasing said bolt means in the direction of said threaded fastener.

3. The assembly defined in claim 1, in which said last-named means includes a slotted member extending across the end of said tubular housing and across said key receiving slot in said lock member so as to permit insertion and withdrawal of said key only when said lock member has a second particular angular position with respect to said housing displaced from said first-mentioned angular position.

4. The assembly defined in claim 1, in which said fastener comprises an internally threaded nut member.

5. A lock assembly to be threadably engaged with a threaded member to serve as a fastener therefor, said assembly including: a tubular housing; a threaded fastener for said threaded member rotatably mounted in said housing; one-way locking means connecting said threaded member and said housing for joint movement in fastener applying direction; a lock member in said housing including a key-receiving slot and also inclding bolt means for preventing rotation of said threaded fastener in said housing when said lock member is actuated by an appropriate key inserted in said slot; and means in said housing for preventing the withdrawal of said key after said lock member has been actuated thereby.

6. The combination defined in claim 5, in which said bolt means includes an axially moveable bolt mounted in said tubular housing, and spring means biasing said bolt towards said fastener to cause said bolt to be received by a well in said fastener when said lock member has been actuated.

7. The combination defined in claim 6, and which includes transverse retainer means in said housing between said bolt and said fastener to permit said bolt to enter said well only when said lock member is turned to a particular angular position in said housing.

References Cited

UNITED STATES PATENTS 1,950,340    3/1934    Ferguson et al. _____ 85— 32
1,767,643    6/1930    Baird _____ 70—231

MARVIN A. CHAMPION, Primary Examiner

A. G. CRAIG, Jr., Assistant Examiner

U.S. Cl. X.R.

70—389; 85—32